United States Patent [19]

Isaken

[11] 4,153,384
[45] May 8, 1979

[54] DOWEL HOLE BORING GUIDE

[76] Inventor: Ike Isaken, 1727 Labrador Dr., Costa Mesa, Calif. 92626

[21] Appl. No.: 857,673

[22] Filed: Dec. 5, 1977

[51] Int. Cl.² .................... B23B 47/28; B23B 39/00; B27C 3/00
[52] U.S. Cl. ................. 408/115 R; 144/92; 408/103
[58] Field of Search ............... 408/72, 103, 108, 115, 408/115 B; 144/92

[56] References Cited

U.S. PATENT DOCUMENTS

| 1,595,674 | 8/1926 | Marshall | 408/103 X |
| 2,783,665 | 3/1957 | Saunders | 408/108 |
| 2,898,785 | 8/1959 | Quick et al. | 408/115 X |
| 3,464,296 | 9/1969 | Harper | 408/115 |
| 3,465,620 | 9/1969 | Hilburn | 408/115 |
| 3,626,513 | 12/1971 | Pytlak | 408/115 |
| 3,674,376 | 7/1972 | Silken | 408/115 |
| 3,685,916 | 8/1972 | Loomis | 408/103 X |

Primary Examiner—Harrison L. Hinson
Attorney, Agent, or Firm—Lyle J. Schlyer

[57] ABSTRACT

The present invention relates to a dowel hole boring guide for precision boring of dowel holes in ends and abutting surfaces of workpieces and is composed of a boring support incorporating a plurality of appropriately sized and spatially related tool guide openings and which support is hingedly connected to a workpiece clamping means with parallel clamping surfaces and wherein the rotational axis of the hinge is perpendicular to the clamping surfaces.

10 Claims, 9 Drawing Figures

FIG. 4
FIG. 5
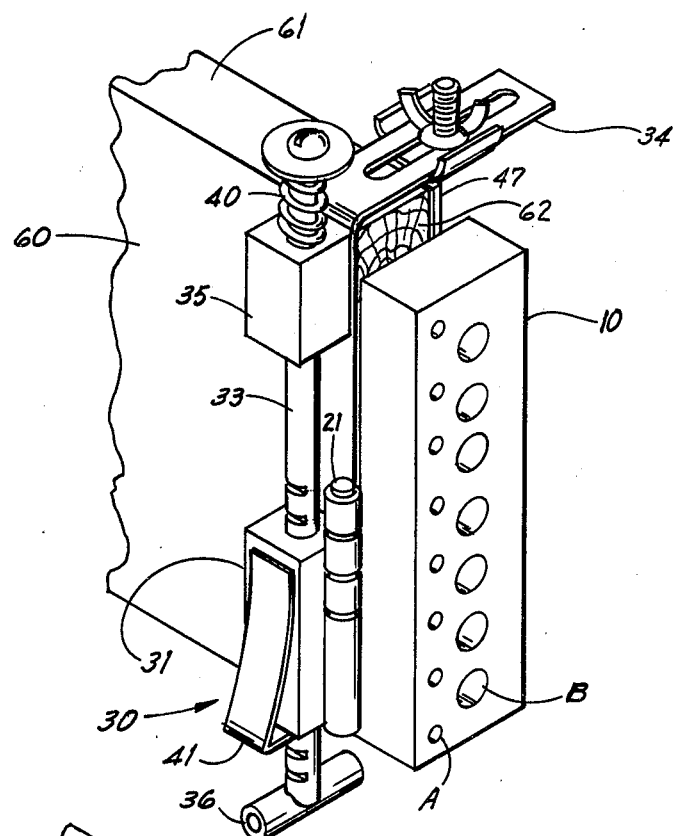
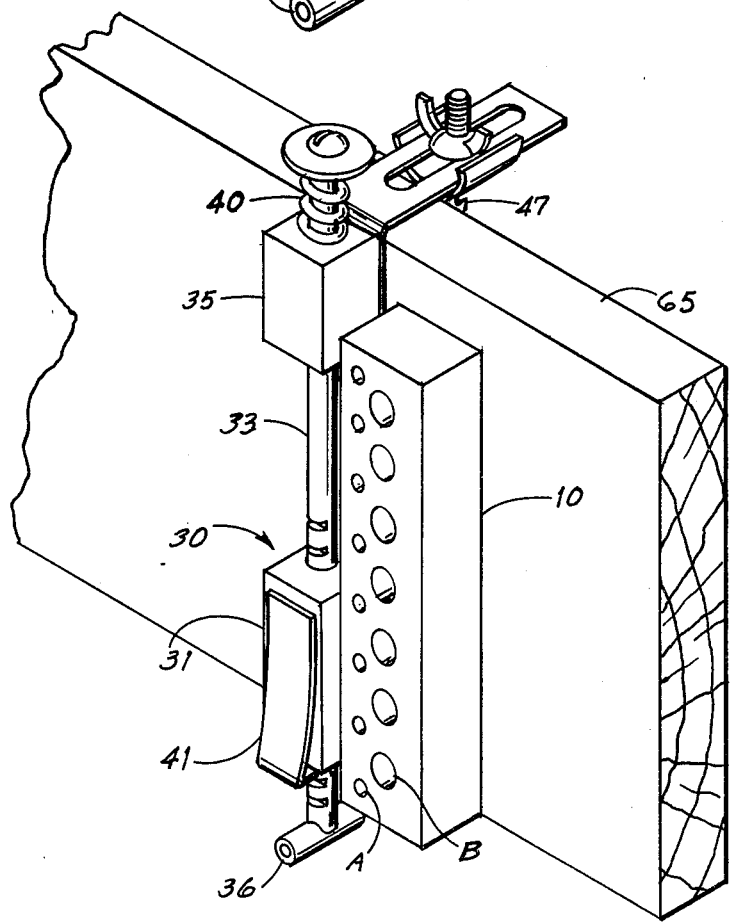

DOWEL HOLE BORING GUIDE

BACKGROUND OF THE INVENTION a. Field of the Invention

This invention relates generally to woodworking tools and specifically tools for use in guiding the boring of dowel holes.

b. Description of the Prior Art

A common requirement in woodworking is the joining of a first work piece, such as a wood board, to a second work piece, using dowels to strengthen the joint. In drilling the dowel holes in the respective work pieces, maintaining precise relative spatial relation between dowel holes is essential since even minor misalignment of opposed dowel holes will result in a gap between the work pieces when joined, thereby weakening the joint and damaging the esthetic appearance of the finished work.

Numerous prior art devices are available which provide for the boring of adequately aligned dowel holes when joining, for example, the edge or end of a first work piece to the edge or end of a second work piece. However, many other common dowel hole drilling requirements are unsatisfactorily solved by the prior art devices. One such common requirement is the joining of the end of a first work piece to the lateral dimension of second work piece, transversely thereto. An example of this requirement is the attachment of a horizontal shelf member intermediate the ends of a vertical frame member in the construction of a book shelf.

As taught in U.S. Pat. Nos. 581,811 and 2,583,283, dowel boring guides may be constructed in combination with clamping means for clamping the guides across the width of each work piece, the clamping surfaces contacting opposing edges of the work piece and being substantially in alignment with the proposed location of the dowel holes. While boring dowel holes in the lateral dimension of a work piece, the clamping surfaces contact sufficient surface area to provide stability for the guide; however, when boring dowel holes in the end of a work piece, inadequate surface area is contacted to provide the required support for precision boring, particularly when relatively thin boards are being joined.

Other boring guides known in the prior art, as disclosed in U.S. Pat. Nos. 1,432,485, 1,762,457, and 2,934,979, provide sufficient clamping surface for precision boring in the end or edge of a work piece by contacting the opposed lateral dimensions of the work piece. These prior art devices are not adaptable for guiding the drilling of dowel holes transverse the lateral dimension of a work piece since clamping across the substantial length of the work piece is required and is clearly prohibitive.

A second source of misalignment inherent in the above referenced prior art is the need to reposition a single cylindrical tool opening such that multiple dowel holes may be bored. The requisite indexing of the boring guide is an obvious source of misalignment. The latter problem is solved to some degree by U.S. Pat. No. 2,930,263 wherein the dowel hole boring guide includes a block containing a plurality of tool openings. However, the configuration of this referenced device is adapted for guiding the boring holes in the ends and edges of work pieces only—not transverse the width intermediate the ends.

A second catagory of doweled joints wherein the prior art devices are unsatisfactory is the drilling of dowel holes in the beveled or angular ends of work pieces, for example, when joining the ends of work pieces to form a skirt or support for a pentagonal or other polygonally shaped table. Again, the problem is that of providing secure clamping support while assuring precise relative spatial alignment of the opposed dowel holes.

As taught in U.S. Pat. No. 2,260,784, dowel boring guides may be constructed in combination with clamping devices whereby shims and spacers may be interposed between the clamping surfaces and the sides of the work pieces, thereby securing the work piece in proper orientation with the dowel hole guide. However, an infinite variety of such shims and spacers would be required in order to provide the capability of matching all possible bevels or angles, an obviously detrimental departure from simplicity of construction.

SUMMARY OF THE INVENTION

In order to provide a dowel hole boring guide for precision boring of dowel holes in the ends of work pieces, including beveled or angular ends, and transverse the lateral dimension of work pieces, the applicant proposes a boring support, incorporating a plurality of appropriately sized and spatially related tool openings, in combination with clamping means adaptable for clamping across the lateral dimension of a work piece, said boring support and clamping means interconnected by a hinge.

The clamping means incorporates clamping surfaces of substantial area thereby providing secure clamping across the lateral dimension of the work piece while the hinged interconnection allows the tool support to be rotated into communication with a multiplicity of various dowel hole boring sites including the beveled or angular ends and the lateral dimensions of work pieces.

BRIEF DESCRIPTION OF THE DRAWING

The invention may be more fuly appreciated from the following detailed description of the preferred embodiment thereof taken in conjunction with the appended drawings wherein:

FIG. 4 is a perspective view of the invention and a work piece showing the invention properly positioned for guiding the boring of dowel holes in the end thereof;

FIG. 5 is a perspective view showing the invention properly positioned for guiding the boring dowel holes in the lateral dimension of a work piece;

DETAILED DESCRIPTION OF THE DRAWINGS

Figure 1:
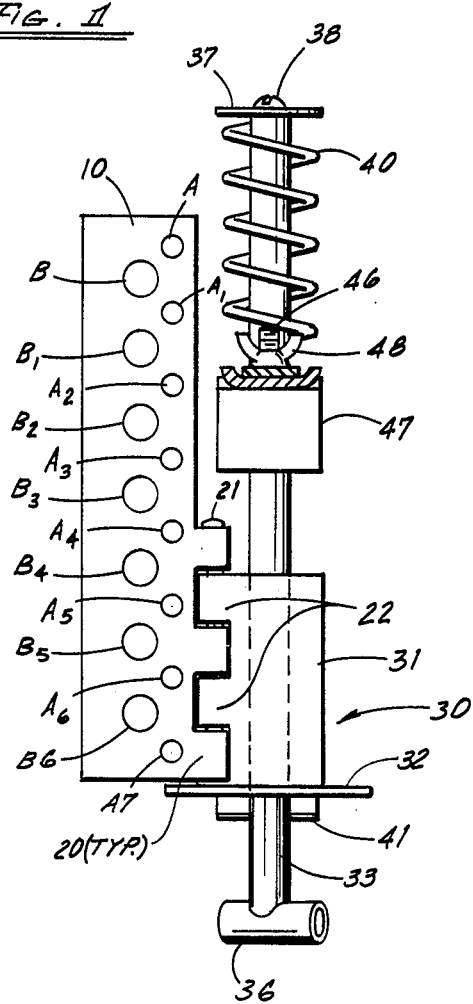
FIG. 1 is a frontal elevation view of an embodiment of this invention.

Referring now to FIG. 1, a boring support 10 may be seen to incorporate first clasp members 20 surrounding a hinge pin 21 and opposed to and cooperating with second clasp members 22, depending from a clamp 30, said first clasp members 20, hinge pin 21, and second clasp members 22 combining to form a hinged connection interposed between the boring support 10 and the clamp 30. The boring support 10 is a block which contains cylindrical tool openings to receive tools such as twist drills. The tool openings preferably incorporate at least two different bore sizes, similarly sized tool openings being equally spaced on a common center line parallel to the hinged pin 21 as shown by tool openings A through $A_7$ and B through $B_6$. The length of the tool support 10 in the direction of the centerline of the tool openings preferably approximates the maximum width of the work pieces to be joined.

Figure 2:
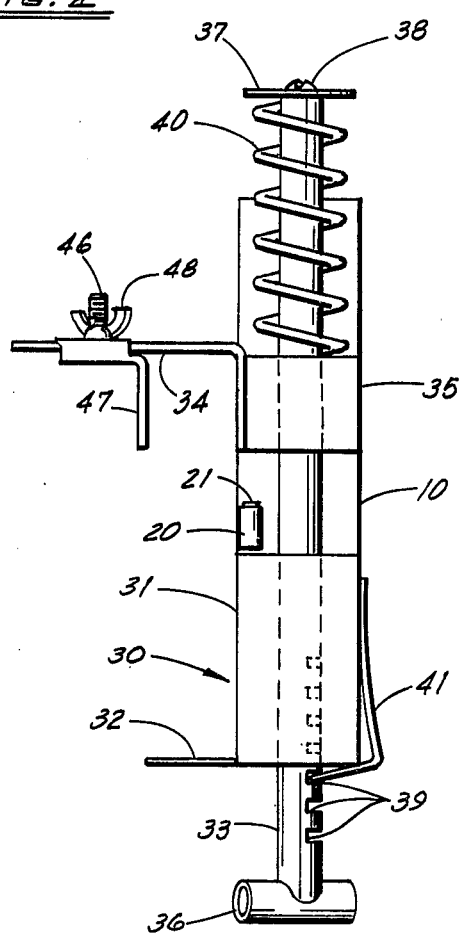
FIG. 2 is a side elevation view.
Figure 3:
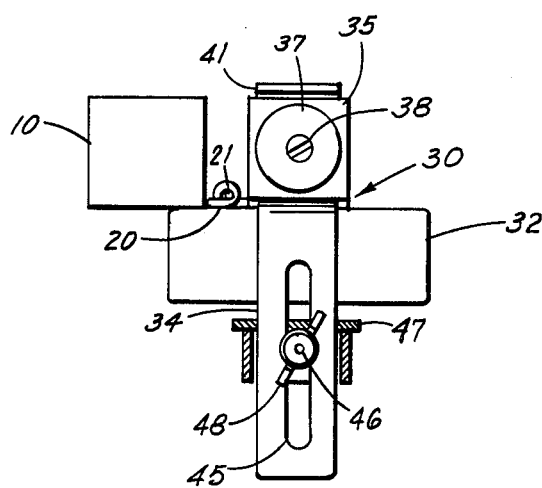
FIG. 3 is a top view.

Now referring to FIGS. 1, 2 and 3, the greater details of a preferred embodiment of the clamp 30 may be seen to include a body member 31 integrally formed with the second clasp members 22, a first clamping surface 32 depending from the body member 31, an adjusting rod 33 slidably passing through the body member 31, as indicated by broken lines in FIGS. 1 and 2, and a second clamping surface 34 parallel to and opposing the first clamping surface 32. The second clamping surface depends from a support block 35 slidably surrounding the adjusting rod 33 as shown by broken lines in FIG. 2. The first clamping surface 32 incorporates substantial surface area in order to provide clamping stability and is preferably of width equal to the maximum thickness of the work piece to be joined.

The adjusting rod 33 incorporates a handle 36 at one end thereof and a retainer 37 at the other end, the retainer 37 removably attached thereto by a screw 38 such that the clamp 30 may be assembled and disassembled. Surrounding the adjusting rod 33 and interposed between the retainer 37 and the support block 35 is a coil spring 40, the function of which will be more readily apparent in conjunction with the discussion of FIGS. 4 and 5.

The adjusting rod 33 further incorporates a plurality of notches 39, perpendicular to the axis of the rod 33 and aligned parallel thereto, said notches 39 approximately equally spaced along a substantial portion of the length of the rod 33 beginning at the handle 36 end. An angled stop 41, preferably constructed of spring steel, may be seen to be attached at one end thereof to the body member 31 such that its resilient characteristics urge the other end of the angled stop 41 into communication with the notches 39. As is apparent from a consideration of FIG. 2, the angled stop 41 may be positioned in contact with any of the plurality of notches 39 by first rotating the adjusting rod 33 approximately 90° to free the angled stop 41, then translatably sliding the adjusting rod 33 within the body member 31 until the desired notch is adjacent to the angled stop 41, and finally rotating the adjusting rod 33 until the stop 41 communicates with the desired notch. Such translation of the adjusting rod 33 tends to increase or decrease the distance between the first clamping surface 32 and the second clamping surface 34 to accomodate work pieces of varying width.

In order that work pieces of varying thickness may be securely held in place between the clamping surfaces 32 and 34, the second clamping surface is provided with a slot 45 in which a guide bolt 46, depending from a work piece support 47, is adapted to move. The support 47 is releasably attached to the second clamping surface 34 by a wing nut 48 such that the wing nut 48 may be slackened and the support 47 slid toward or away from the support block 35 to a desired position and there again tightened.

Now referring to FIGS. 4 and 5, the method of operation of the invention when joining the end of a first work piece 60 transverse the lateral dimension of a second work piece 65 may be seen. FIG. 4 illustrates the use of the invention for guiding the boring of dowel holes in the end of the first work piece 60, typically a wood board. As a first step, the position of the work piece support 47 is adjusted to conform with the width of the board 60 as discussed above. Next, the clamp 30 and the boring support 10 are rotated about the hinge pin 21 such that the juxtapositional surfaces of the respective members form right angles. The clamp 30 may then be positioned such that the edge 61 of the board 60 contacts the second clamping surface 34 of the clamp 30 and the end 62 of the board 60 contacts the boring support 10. The clamp 30 may then be secured across the width of the board 60 by rotating the handle 36 of the adjusting rod 33, sliding the body member 31 along the rod 33 toward the second clamping surface 34 until the depending first clamping surface 32 (unshown in FIGS. 4 and 5) contacts the board 60 and continuing until the coil spring 40 is in compression, and finally, again rotating the rod 33 into securing relationship with the angled stop 41. As is readily apparent, the coil spring 40 maintains a constant clamping force across the width of the board 60. With the invention thus positioned, a boring tool, such as a twist drill, sized to slidably engage the appropriate tool openings in the tool support 10, may be used to bore a plurality of dowel holes.

The size of the tool openings, for example, A or B, may be chosen to correspond to a standard dowel diameter and the common center line of similarly sized openings may be positioned at such distance from the hinge pin 21 as to correspond to the center of the width of standard sized boards.

Now refering to FIG. 5, the operation of boring dowel holes transverse the width of a second board 65 may be seen to be similar to that described above albeit with the clamp 30 and tool support 10 rotated about the hinge pin 21 such that the face of the clamp 30 and the face of the tool support 10 reside in a common plane. The same tool openings used with respect to the first board 60 may be used to guide the boring of dowel holes in the second board 65, thus assuring proper alignment of the two sets of holes.

Figure 6:
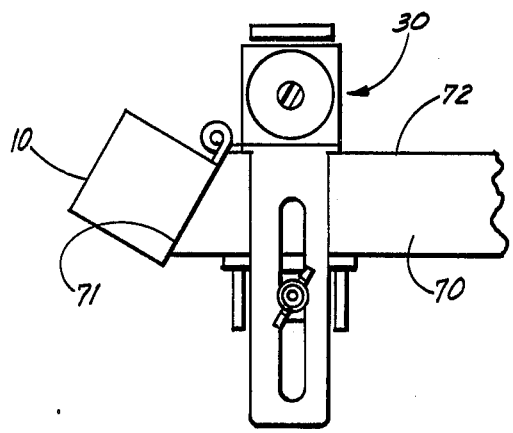
FIG. 6 is a top view showing the invention positioned for guiding the boring of dowel holes in the beveled end of a work piece.
Figure 7:
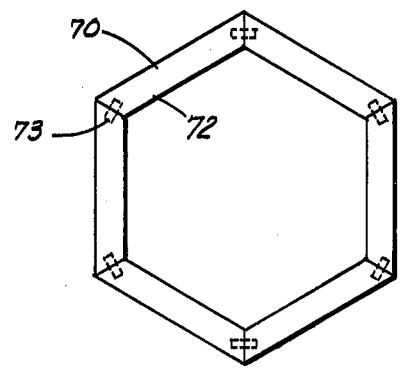
FIG. 7 is a cross-sectional view of a structure formed from work pieces similar to that shown in FIG. 6.

FIGS. 6 and 7 illustrate the method of operation of the invention when joining the beveled ends of respective boards when the surface described by an end 71 of a board 70 forms an obtuse angle with a side 72 of the board 70. Again, the operation may be seen to be similar to that described above, however, in this instance, the clamp 30 and tool support 10 are rotated about the hinge pin 21 such that the face of the clamp 30 and the face of the tool support 10 conform to the angle formed by the end 71 and side 72 of the board. FIG. 7 illustrates a structure such as a cross-section of a hexagonal column or table skirt jointed by dowels 73, shown in broken lines, residing in dowel holes bored as shown in FIG. 6. While a hexagonal figure is illustrated, it is readily apparent that the invention is adaptable to the angle of any similarly beveled end, thus allowing the construction of an infinite variety of polygonal shapes.

Figure 8:
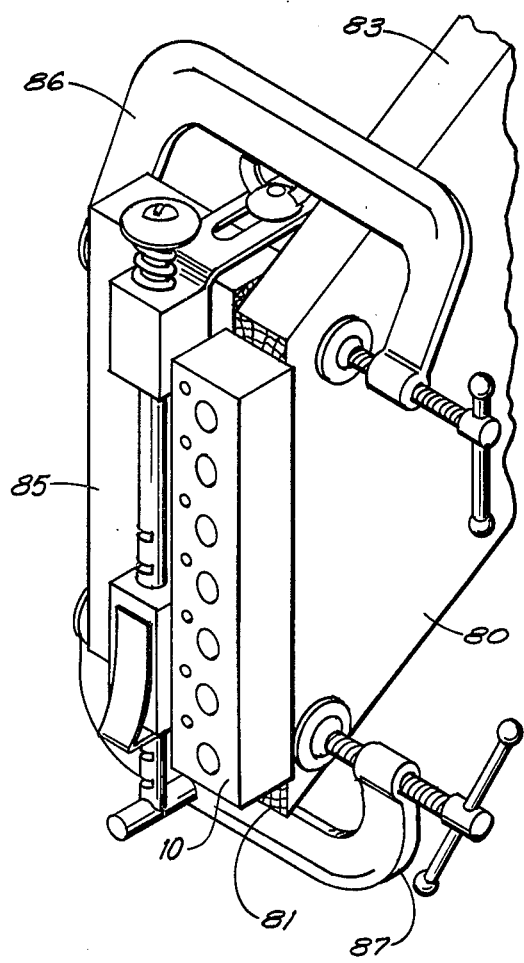
FIG. 8 is a perspective view of the invention and a supplemental block positioned for guiding the boring of dowel holes in the angled end of a work piece.
Figure 9:
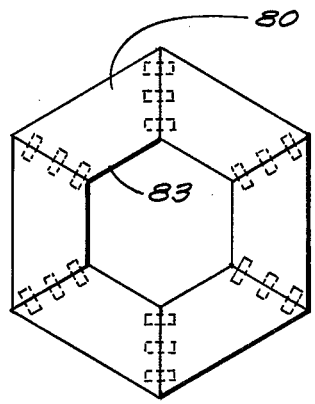
FIG. 9 is a top view of a structure formed from work pieces shaped similar to the work piece in FIG. 9.

FIGS. 8 and 9 illustrate the use of the invention for forming polygonal structures where it is desired that the edges of the boards used describe the polygon. FIG. 9 represents one of an infinite number of such possible structures. In this instance, an end 81 of a board 80 forms an obtuse angle with an edge 83 of the board 80.

As a first step in guiding the boring of dowel holes in such angular ends, a supplemental block 85 is clamped across the width of the board 80 such that one surface of the block 85 resides in the same plane as the end 81 of the board 80. The supplemental block 85 may be held in place with adjustable clamps 86 and 87 of a type well known in the prior art. The invention may then be clamped in place on the supplemental block 85 with the tool support 10 appropriately communicating with the end 81 of the board. Again, while a hexagonal structure is illustrated, it is readily apparent that an infinite variety of polygonal structures may be constructed in this manner.

It is understood that the embodiments, described above are merely examples of the application of the principles of this invention. Additional embodiments may be devised by those skilled in the art without departing from the spirit or scope of the invention.

I claim:

1. A dowel hole boring guide comprising:
   a tool support having at least one tool opening passing therethrough;
   a clamp adapted for clamping across the width of a work piece which is to receive a dowel hole, said clamp incorporating at least two parallel clamping surfaces adapted for contacting opposed edges of said work piece; and,
   a hinge interposed between and connecting said tool support and said clamp, said hinge having a rotational axis perpendicular to said clamping surfaces.

2. The device of claim 1 wherein the clamp incorporates clamping surfaces adapted for contacting a substantial portion of the opposed edges of said work piece.

3. The device of claim 1 wherein the clamp comprises:
   a first clamping surface perpendicular to the rotational axis of the hinge, said first clamping surface adapted for contacting a substantial portion of an edge of the work piece;
   a second clamping surface, parallel to said first clamping surface, and adapted for contacting an opposed edge of the work piece and,
   adjusting means interconnecting said clamping surfaces such that the distance between said first clamping surface and said second clamping surface may be varied.

4. The device of claim 3 wherein the adjusting means incorporates a spring cooperating with said second clamping surface and urging said clamping surfaces into secure contact with the edges of said work piece.

5. The device of claim 3 wherein the second clamping surface incorporates a support plate perpendicular thereto and adjustable toward and away from the clamp whereby the opposed sides of the work piece may be securely positioned between said support plate and the clamp.

6. The device of claim 1 wherein the tool support incorporates at least two cylindrical, parallel axis tool openings passing therethrough.

7. The device of claim 1 wherein the tool support incorporates a plurality of cylindrical parallel axis tool openings passing therethrough, said tool openings consisting of at least one diameter, tool openings of common diameter positioned to share a center line parallel to the rotational axis of said hinge.

8. A dowel hole boring guide for guiding the precision boring of dowel holes in the sides and beveled and angular ends of a work piece comprising:
   a tool support incorporating at least two parallel axis tool openings passing therethrough;
   a clamp incorporating clamping surfaces adapted for securely communicating with a substantial portion of opposed edges of the work piece; and
   a hinge interposed between and interconnecting said tool support and said clamp, said hinge having a rotational axis perpendicular to the clamping surfaces of said clamp, whereby the tool support may be selectively rotated to communicate alternatively with the sides or ends of the work piece.

9. The device of claim 8 wherein the tool openings share at least one common center line parallel to the rotational axis of said hinge.

10. The device of claim 8 wherein the clamp further comprises a secondary clamp assembly for securely engaging the sides of the work piece.

* * * * *

UNITED STATES PATENT AND TRADEMARK OFFICE
CERTIFICATE OF CORRECTION

PATENT NO. : 4,153,384
DATED : May 8, 1979
INVENTOR(S) : Ike Isaksen

It is certified that error appears in the above-identified patent and that said Letters Patent are hereby corrected as shown below:

On the title page, Item [76], "Isaken" should read --- Isaksen ---.

Signed and Sealed this

Thirty-first Day of July 1979

[SEAL]

Attest:

LUTRELLE F. PARKER

Attesting Officer      Acting Commissioner of Patents and Trademarks